United States Patent [19]

Blankenhorn

[11] 4,303,854
[45] Dec. 1, 1981

[54] DIETARY AID FOR ACCUMULATING MACHINE READABLE INFORMATION

[76] Inventor: David H. Blankenhorn, 1165 Afton St., Pasadena, Calif. 91103

[21] Appl. No.: 704,447

[22] Filed: Jul. 12, 1976

Related U.S. Application Data

[63] Continuation-in-part of Ser. No. 448,494, Mar. 9, 1974, Pat. No. 3,980,866.

[51] Int. Cl.³ .................. G06K 19/06; G06K 19/00
[52] U.S. Cl. .................................. 235/492; 235/487
[58] Field of Search ............. 235/61.12 N, 61.11 R, 235/61.6 E, 61.12 R, 492, 487

[56] References Cited

U.S. PATENT DOCUMENTS 3,639,732  2/1972  Crain et al. ............. 235/61.12 N
3,986,001  10/1976  Saito ........................ 235/61.11 E Primary Examiner—Vincent P. Canney
Attorney, Agent, or Firm—Christie, Parker & Hale

[57] ABSTRACT

This invention is directed to apparatus used in accumulating, in machine readable form, oral consumption information concerning an individual patient. The invention is preferably embodied in a book comprising a plurality of record members which are bound together as leaves of the book. Each record member has obverse and reverse sides and defines on one of its sides a plurality of item display areas. Each item display area comprises an item representation of an item for oral consumption, a multiple choice entry location where machine readable information can be entered, and indicia serving to interrelate the item representation and the multiple choices. Each item representation includes a written description of the represented item and a picture illustrating both the nature of the represented item and a unit quantity thereof. To interrelate the item representation and the entry location, the indicia describe discrete selectable quantities of the represented item with the described quantities bearing fixed ratios to the illustrated unit quantity. The record members can be detached from the book to facilitate digital data processing of the recorded oral consumption information.

9 Claims, 8 Drawing Figures

Fig. 4

| | | |
|---|---|---|
| 2<br>1<br>½<br>¼ | (egg illustration) | EGG;<br>ONE EGG IS THE UNIT WHETHER SCRAMBLED, BOILED, ETC.;<br>AVOID TOO MANY EGGS BECAUSE OF CHOLESTEROL. |
| 2<br>1<br>½<br>¼ | (spoon illustration) | SUGAR;<br>ONE TEASPOON IS THE UNIT.<br>AVOID TOO MUCH SUGAR BECAUSE OF HIGH CALORIC CONTENT. |
| 2<br>1<br>½<br>¼ | ANOTHER FOOD ITEM PICTURE | CORRESPONDING WRITTEN DESCRIPTION |
| 2<br>1<br>½<br>¼ | | |
| 2<br>1<br>½<br>¼ | | |

{20}

| | | |
|---|---|---|
| 14<br>2<br>1<br>½<br>¼ | | |
| 2<br>1<br>½<br>¼ | | |
| 3<br>2<br>1<br>0 | (pills illustration) | DESCRIPTION OF PRESCRIBED MEDICATION INCLUDING INSTRUCTIONS AS TO DOSAGE. |
| 2<br>1<br>½<br>¼ | | |

BREAKFAST "A" AND MEDICATIONS {21}

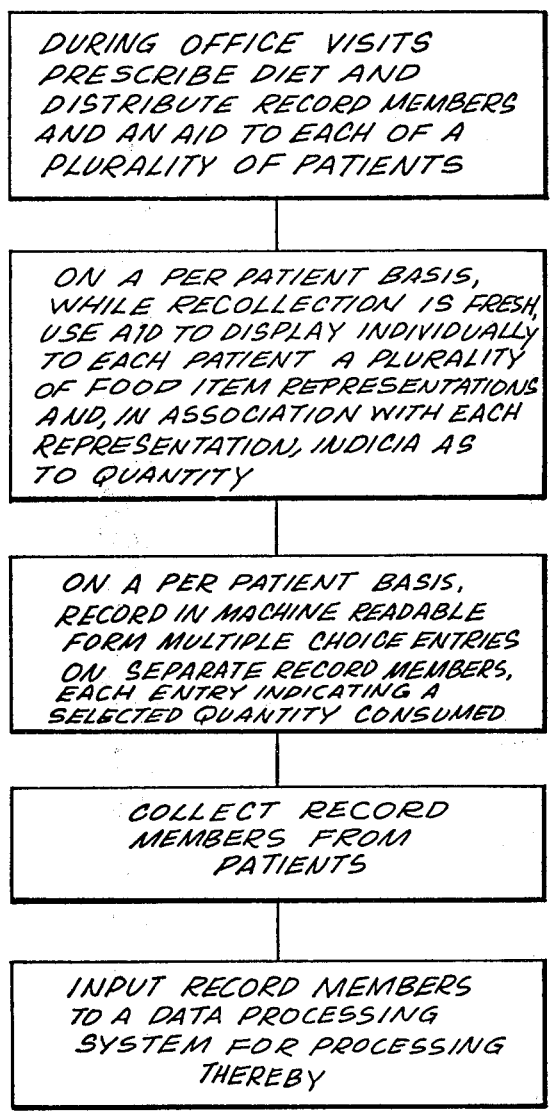

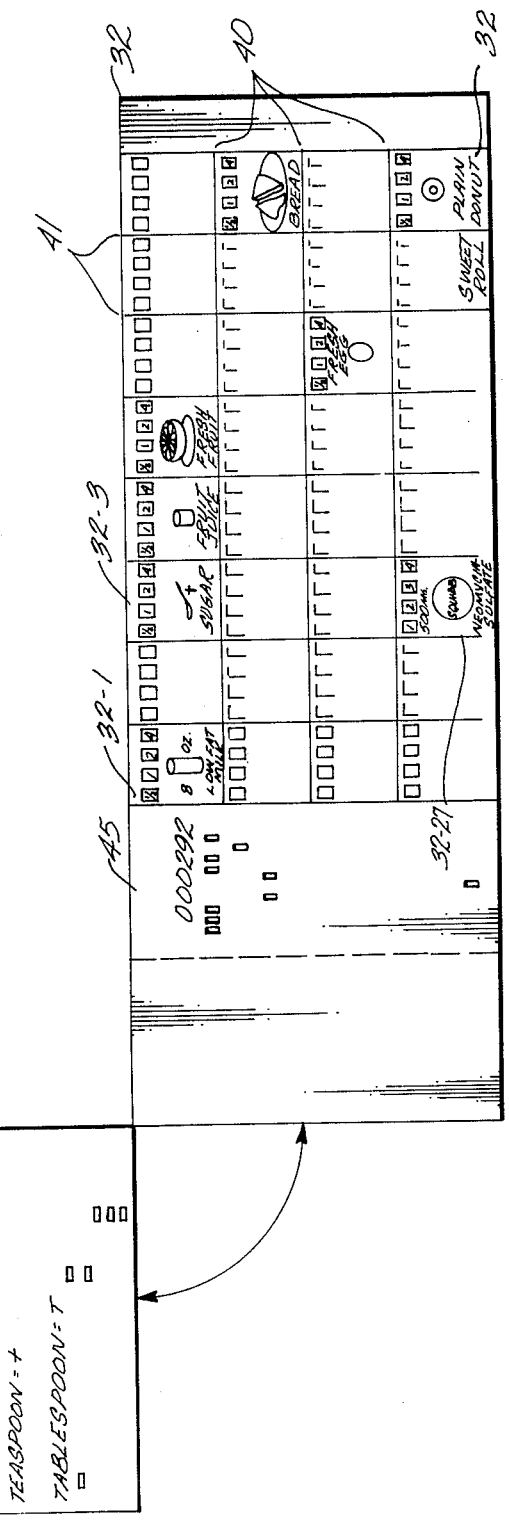
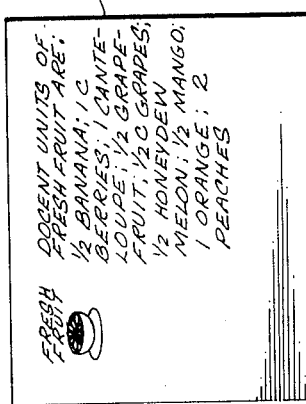
Fig. 1

DIETARY AID FOR ACCUMULATING MACHINE READABLE INFORMATION

REFERENCE TO EARLIER APPLICATION

This is a continuation-in-part of allowed application Ser. No. 448,494, filed Mar. 9, 1974, which issued on Sept. 14, 1976 as U.S. Pat. No. 3,980,866

BACKGROUND OF THE INVENTION

This invention relates to apparatus for accumulating a dietary journal in machine readable form.

There has long been a need to conserve the time of nutrition therapists, whose time is very valuable, whether they be doctors or paraprofessionals. In the past, nutrition therapists have had to spend a great deal of time in attempting to elicit from a patient what his diet consists of. It is of course important for proper diagnosis and therapy that the nutrition therapist have a detailed breakdown or profile of the nature and amounts of food consumed by the patient.

Recently, efforts have been made to employ data processing techniques in the production of such profiles. In a supplement to the journal "Circulation", there was published in Mar. 1968, the National Diet-Heart Study Final Report. This report describes the development of guidelines for food record coding and the use of computers to process the coded information. Another effort along similar lines is described in the Journal of The American Dietetic Association, volume 48, published in 1966, at pages 101-108. Described therein is the use of an IBM 650 data processing system for reduction of data relating to food consumption.

The foregoing efforts, however, have not involved the preparation, on a per patient basis, of a dietary journal in machine readable form. Instead, either such information as the patient may recall has been elicited during occasional office visits or else ordinary journals have been accumulated and then subsequently reduced to machine readable form. The translation of the ordinary records into machine readable form is of course time-consuming and subject to errors.

As to eliciting information from a patient, his memory is likely to be faulty, particularly as to the details of how much food of what food groups he has eaten weeks before his visit to the therapist's office. This leads to extra time being spent to jog the patient's memory and, even worse, to an incomplete and inaccurate profile.

There has further been a need to facilitate the teaching of a proper diet. During the period of time intervening between office visits, typically weeks, the patient is likely to forget how much of each particular food group he should consume.

The foregoing needs with regard to accumulating information as to a patient's oral intake of nutrients are also applicable as to a patient's oral intake of pills and other prescribed medication.

SUMMARY OF THE INVENTION

This invention is directed to meeting these needs and eliminating these problems through the preparation, on a per patient basis, of a dietary journal in machine readable form.

A first embodiment of the invention cooperates with a machine readable record member to accumulate the dietary journal. In this first embodiment means are provided for releasably holding the record member, which may be a standard punch card. The record member has a plurality of spaced-apart entry locations. The first embodiment includes a plurality of displays each including at least one item representation of an item for oral consumption with each item representation corresponding to a different one of the entry locations. Significantly, each item representation comprises a written description of the represented item and a picture illustrating both the nature of the represented item and a unit quantity thereof. The picture facilitates quick recognition and enables use even by patients who do not read. Significant also, as to teaching the patient, is the feature whereby the picture illustrates a unit quantity of the item whether it be a nutrient or a prescribed medication (for test or otherwise). Preferably, the background for each item representation is color coded as a teaching aid. For example, for a patient on a low cholesterol diet, eggs are advantageously displayed against a red background, and with less undesirable food items being displayed against a yellow background, and with desirable food items being displayed against a green background. In association with each item representation there is indicia describing discrete selectable quantities of the represented item.

The displays are arranged for one-by-one exhibition. Preferably, the displays form two groups of leaves, each being hinged on an opposite side of a frame. In closed positions, the leaves cover a window for access to the record member. In turning over of the leaves to exhibit the displays one-by-one, there is exposed in registration therewith each of the entry locations corresponding to the exhibited displays. Manually operable input means provide for entering digitally encoded consumption data at the exposed entry locations.

In a preferred feature, in combination with the accumulation of a dietary journal, the apparatus provides for the accumulation in machine readable form of data as to the results of a test, following the intake of medication such as those typically self-conducted by patients.

In a second, presently preferred embodiment, the invention provides a book for accumulating in machine readable form oral consumption information concerning a patient. The book comprises a plurality of record members each having obverse and reverse sides. Each of said plurality of record members defines on one of its sides a plurality of item display areas arranged in a multi-row, multi-column matrix of item display areas. Each item display area includes an item representation of an item for oral consumption. As with the item representation provided on each display in the first embodiment, there is included a written description of the represented item and a picture illustrating both the nature of the represented item and a unit quantity thereof. Each item representation on the record member further includes indicia describing discrete selectable quantities of the represented item with the described quantities bearing fixed ratios to the illustrated unit quantity. It further includes a multiple-choice entry location at which machine readable information can be entered by the individual patient to indicate as a selected one of the selectable quantities the one corresponding to the amount of consumption by the individual patient of the represented item.

The book further comprises binding means for securing the record members together as leaves of a book, and means for detaching the record members from the binding means whereupon the record members can be processed by data processing peripheral equipment.

Preferably, each record member has the overall configuration of a standard 80-column punch card; and, like such a standard punch card, it defines a plurality of bit-defining coordinate spaces. The coordinate spaces of a standard punch card are arranged in a coordinate matrix such that they are respectively positioned at the intersections of 12 imaginary lines, each extending parallel to the longitudinal edges of the card, and of 80 imaginary lines, each extending transversely. Each multiple-choice entry location includes a plurality of bit entry spaces respectively positioned at a different one of said intersections.

BRIEF DESCRIPTION OF THE DRAWINGS

FIG. 4 is a view enlarged with respect to FIG. 3, showing the display 21 in more detail;

FIG. 5 is a flow chart showing the steps of a method according to the invention;

FIG. 7 is a plan view showing the reverse side of the cover of the book, and the obverse side of record member bound as the first leaf of the book.

DETAILED DESCRIPTION

Figure 1:
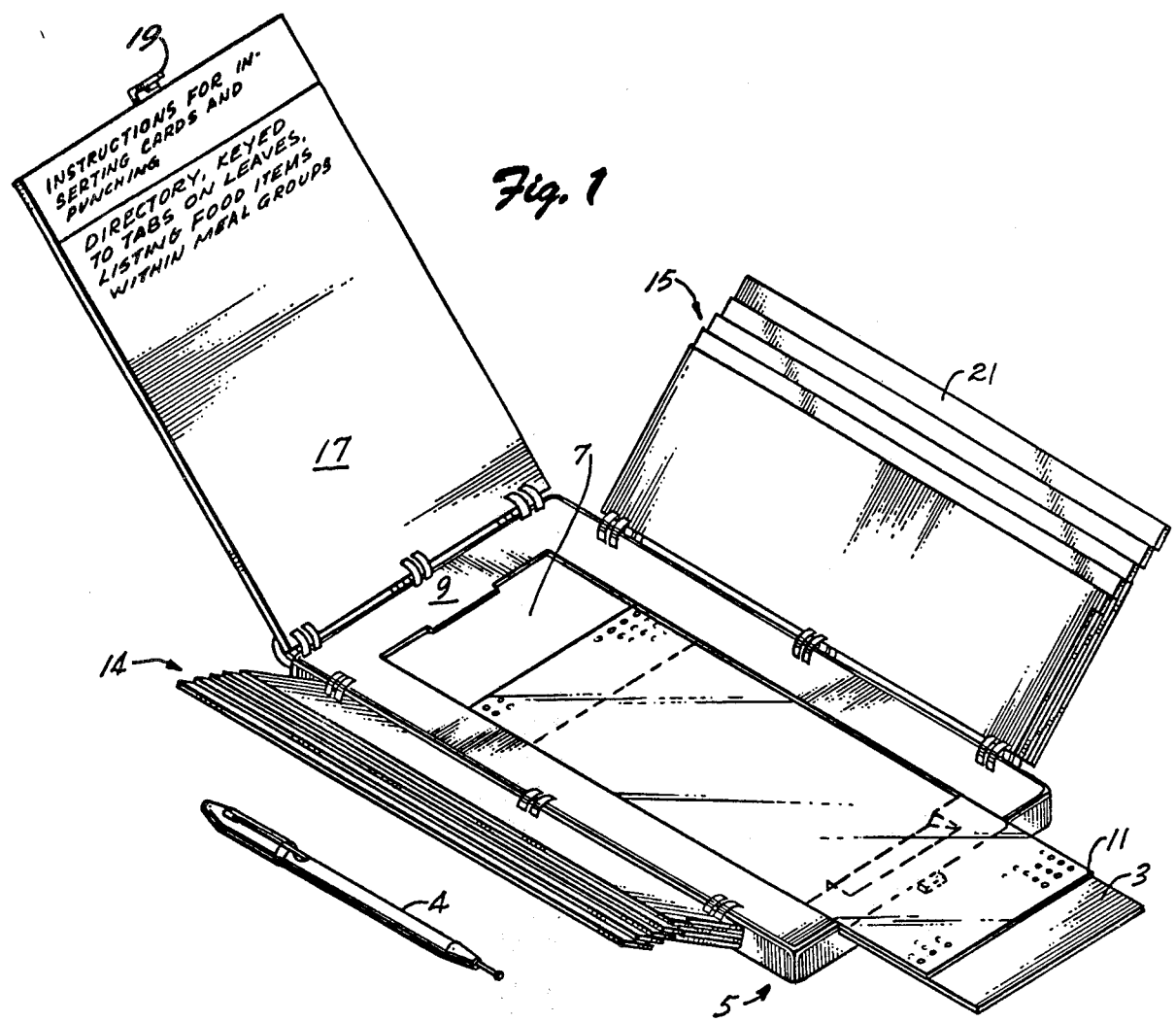
FIG. 1 is a perspective view of a dietary aid according to a first embodiment of this invention.
Figure 2:
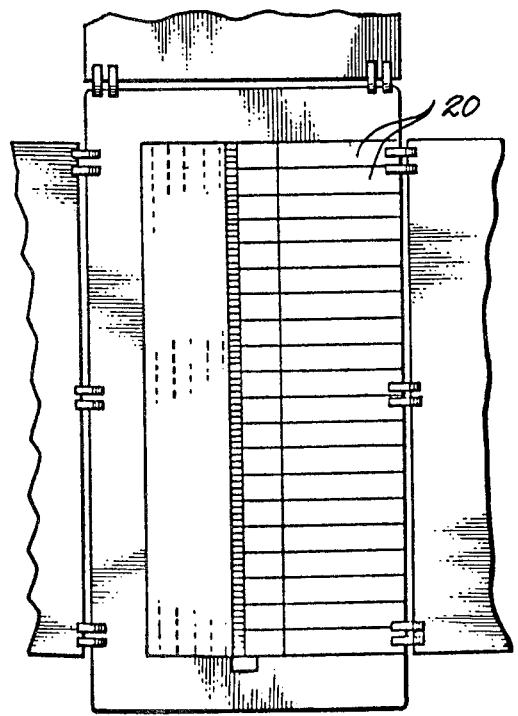
FIGS. 2 and 3 are each plan views, partially broken away, of the dietary aid of FIG. 1, and show the manner in which entry locations of a machine readable record member are exposed in registration with separate displays.

FIG. 1 shows a dietary aid according to a first embodiment of this invention. The dietary aid of FIG. 1 is adapted to cooperate with a machine readable record member to accumulate, on a per patient basis, a dietary journal.

As illustrated in FIG. 1, the cooperating record member is preferably a standard punch card 3 having a plurality of coordinate spaces where the card is adapted to be punched to define information that can be recognized by a punch card reader. Manually operable means such as a stylus 4 provide for punching holes.

The aid of FIG. 1 includes means for releasably holding one card at a time, which preferably comprises a generally rectangular frame 5 having an elongated, longitudinally extending window 7. The periphery of the window 7 is defined by a generally U-shaped front wall 9 of the frame. At its front lower end, the frame has a recess opening into the window so that the card is slidable into the frame.

The coordinate spaces of a standard punch card are arranged in a coordinate matrix such that they are respectively positioned at the intersections of 12 imaginary lines, each extending parallel to the longitudinal edges of the card, and of 80 imaginary lines, each extending transversely.

After its insertion into the aid of FIG. 1, that which is by convention considered to be the left edge of the punch card is positioned at the top. Thus, from the perspective of a user of the aid, a separate row of 12 spaces is defined by each group of coordinate spaces extending along one of the transverse imaginary lines, and a separate column of 80 spaces is defined by each group of coordinate spaces extending along one of the longitudinal imaginary lines.

Advantageously, some of the columns of spaces (e.g., two columns thereby providing a total available number of 160 coordinate spaces) are pre-punched so as to define information identifying the patient and the type of diet he has been prescribed. With two columns pre-punched, there remain columns of spaces with 800 (i.e., 80×10) coordinate spaces, these being classified in accordance with the first embodiment into 200 (i.e., 20×10) entry locations. Each of these entry locations includes a different group of four of the coordinate spaces, and each group of four occupies a different one of a matrix of areas on the card.

Advantageously, there is provided a template 11 that slides into and out of the frame in the same manner as the card. The template has a matrix of holes that serve as a guide during punching operations. With the template and the card being in place within the frame one atop the other, each of the holes in the matrix overlies a separate one of the plurality of card coordinates. To facilitate insertion and withdrawal, a notch (shown in dashed lines in FIG. 1) is provided at the front lower end of the frame.

The aid of FIG. 1 further includes a plurality of displays that are arranged for one-by-one exhibition. In the first embodiment, as best shown in FIG. 1, the displays are preferably organized into two groups of leaves (indicated generally at 14 and 15), each group being hinged on an opposite longitudinal edge of the frame. The leaves are manually pivotal between open and closed positions, and, in FIG. 1, each of the leaves is shown in its open position.

Preferably, the aid of FIG. 1 further includes a top cover 17 that is hinged on the top transverse edge of the frame. A catch 19 is fixed to the top cover so that when it is folded down over the displays it can be locked in place.

The use of the aid of FIG. 1 is presently contemplated as follows. A patient visits a physician who prescribes a therapeutic goal for the patient and provides him with an aid that is adapted for the particular kind of diet prescribed. The patient is given instructions as to how to record information. For reinforcement purposes, advantageously, a summary of these instructions and a directory of food items within the diet is given on the inside of the top cover. Preferably, the directory is arranged in lists of recommended food items, separate lists being given for recommended meals. According to the first embodiment, a different card is to be used on each day to accumulate information as to the patient's actual food intake on that day. Accordingly, when the patient is initially given the aid and again on each subsequent conference concerning his progress, the patient is given a sufficient number of cards to accumulate a dietary journal covering the period between visits.

An important aspect of the dietary aid of this invention is its advantage in teaching the patient what his diet should consist of. To this end, as best shown in FIG. 4, each display includes at least one food item representation. Preferably, for compactness, each display is divided into twenty separate areas 20. Contained in each area 20 there is a separate food item representation. Thus, there are preferably twenty such food item representations per display in accordance with the first embodiment. Each food item representation comprises a written description of and a picture illustrating both the nature of represented food item and a unit quantity thereof. The picture facilitates quick recognition and enables use of the aid even by patients who do not read.

Preferably, the background area on the leaf for each food item representation is color coded so as to aid in teaching the prescribed diet. Thus, red is used to indicate an undesirable food item, green to indicate a desirable food item and yellow to indicate a food item in between. For example, for a patient on a low cholesterol diet, the background for a food item such as eggs is colored red.

In association with each food item representation there is indicia describing discrete selectable quantities of the represented food item. In the first embodiment, each of the areas 20 includes a plurality of sub-areas arranged in a column with each sub-area containing a different one of four quantity indicators such as 2 units, 1 unit, ½ unit, and ¼ unit. As generally described above, the picture portion of a food item representation illustrates the unit quantity of the food. For example, sugar is preferably shown in a teaspoon thereby indicating that amount as a unit. Preferably, as best shown in FIG. 4, each such sub-area registers with a different card coordinate space. FIG. 4 also shows a representation of an item for oral intake of the type in which a prescribed medication in the form of a pill is displayed. It will be evident that providing this food item representation for the display for other breakfast item serves also as a reminder to the patient to take a prescribed dosage. Inasmuch as it is customary for pharmaceutical manufacturers to provide distinctive color coatings for various types of pills, preferably the pills are represented in such distinctive colors.

As mentioned above, the displays form two groups of leaves, each group being hinged on an opposite longitudinal edge of the frame. With the leaves being folded over to closed positions, they cover the window 7. In turning the leaves over one-by-one to exhibit the displays, there is exposed in registration therewith each of the entry locations corresponding to the exhibited displays.

The five leaves in each group vary in width. Thus as to each leaf, with it being in its closed position, a respectively predetermined part of the window is covered and the remaining part is uncovered. On opposite sides of the boundary, defined by the free longitudinal edge of the leaf, there is simultaneously exposed some of the entry locations and the surface of the leaf that is opposite the window. Each of these boundaries defines a line parallel and closely spaced to a respective column of the matrix of areas on the card 3, whereby each of the leaves registers with a different group of entry locations.

Advantageously, for ready reference thereto, each of the leaves has an index tab keyed to the directory given on the top cover. Thus, one of the listed meals is headed "breakfast A", and one of the tabs is identically labeled.

Figure 3:
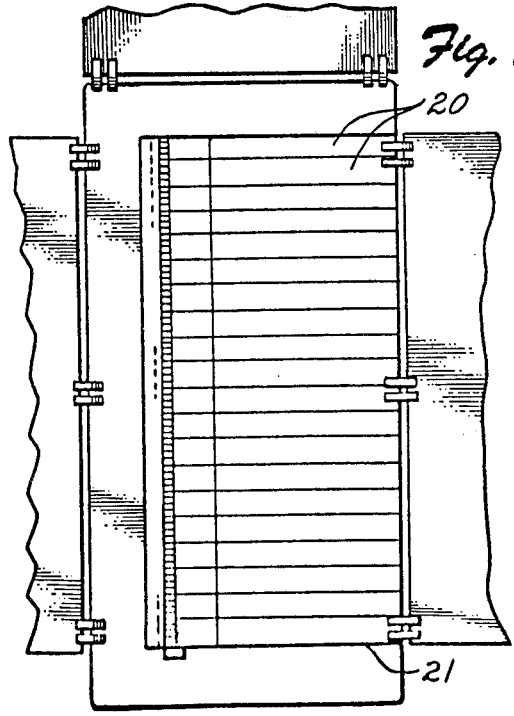

The five leaves in the group that unfolds to the right register respectively with the five columns of spaces on the left side of the card 3. For example, as shown in FIG. 3, a display 21 of this group so registers in that, while in its closed position, its longitudinal edge is aligned slightly to the right of the first column of 80 spaces on the card 3. Each of its twenty separate areas 20 is thus aligned with a respective one of twenty entry locations. And, with respect to each entry location, the four card coordinate spaces respectively align with the four subareas containing quantity indicators that constitute the quantity indicia of the corresponding food item indicia.

The patient uses the stylus 4 to punch holes to record in the first column of coordinate spaces how much during a particular meal he consumed of the food items represented on the display 21. If during that meal he abstained from a particular nutrient, he does not punch a hole. Otherwise, he punches the card coordinate adjacent the quantity indicator corresponding to the number of units he consumed of the represented nutrient. As to recording the patient's oral intake of prescribed medicine, it is advantageous to provide (as indicated in FIG. 4) for a positive indication that zero units were taken.

In a preferred feature, in combination with the accumulation of a dietary journal, the apparatus provides for the accumulation in machine readable form of data as to the results of tests. Thus, one of the areas 20 on an appropriately tabbed leaf can be devoted to a picture illustrative of and instructions as to recording the results of a self-conducted test such as the well-known urine test-tape test. The Ames Company, for example, sells under the trademark "Uristix", reagent strips that can be used in a patient-conducted test for glucose and protein in urine. The test results as to what quantized color range the strip exhibits are recordable in machine readable forms in the same manner as described above with reference to quantized amounts of food items consumed. The test results may be an integral part of medication using the dietary aid.

It will be apparent to those skilled in the art that there can be constructed and used alternative arrangements to the dietary aid described above that are within the scope of this invention. Merely by way of example, for purposes of recording the information in machine readable form, a mark/sense sheet or pencil approach can be used. This is the type of approach commonly used in connection with multiple-choice tests given by national testing services such as the College Entrance Examination Board and others.

The flow chart of FIG. 5 shows the steps of a method according to this invention. The allowed application cross-referenced above is directed to this method. A preliminary step involves the prescribing by a nutrition therapist of a diet for each of a plurality of patients. With each general type of diet, such as low salt or low cholesterol or the like, there is a corresponding aid adapted to accumulate a dietary journal concerning that type of diet. The aids and record members used in connection therewith are distributed, preferably during office visits, to each of a plurality of patients.

On a per patient basis, while their recollection is fresh as to their consumption of food items on their respective diets, each aid is used to display individually to each patient a plurality of food item representations and, in association with each represented food item, indicia describing discrete selectable quantities of the represented food item.

The patient records multiple-choice entries in machine readable form, preferably on a sequence of a sufficient number of separate record members distributed to the patient to accumulate a dietary journal covering the period between visits. Each multiple choice entry indicates as a selected one of the selectable quantities the one corresponding to the amount of consumption by the patient of one of the represented food items.

After the information has been recorded, it is inputted to a data processing system, preferably by collecting separate record members for the patient for processing at a central location.

Figure 6:
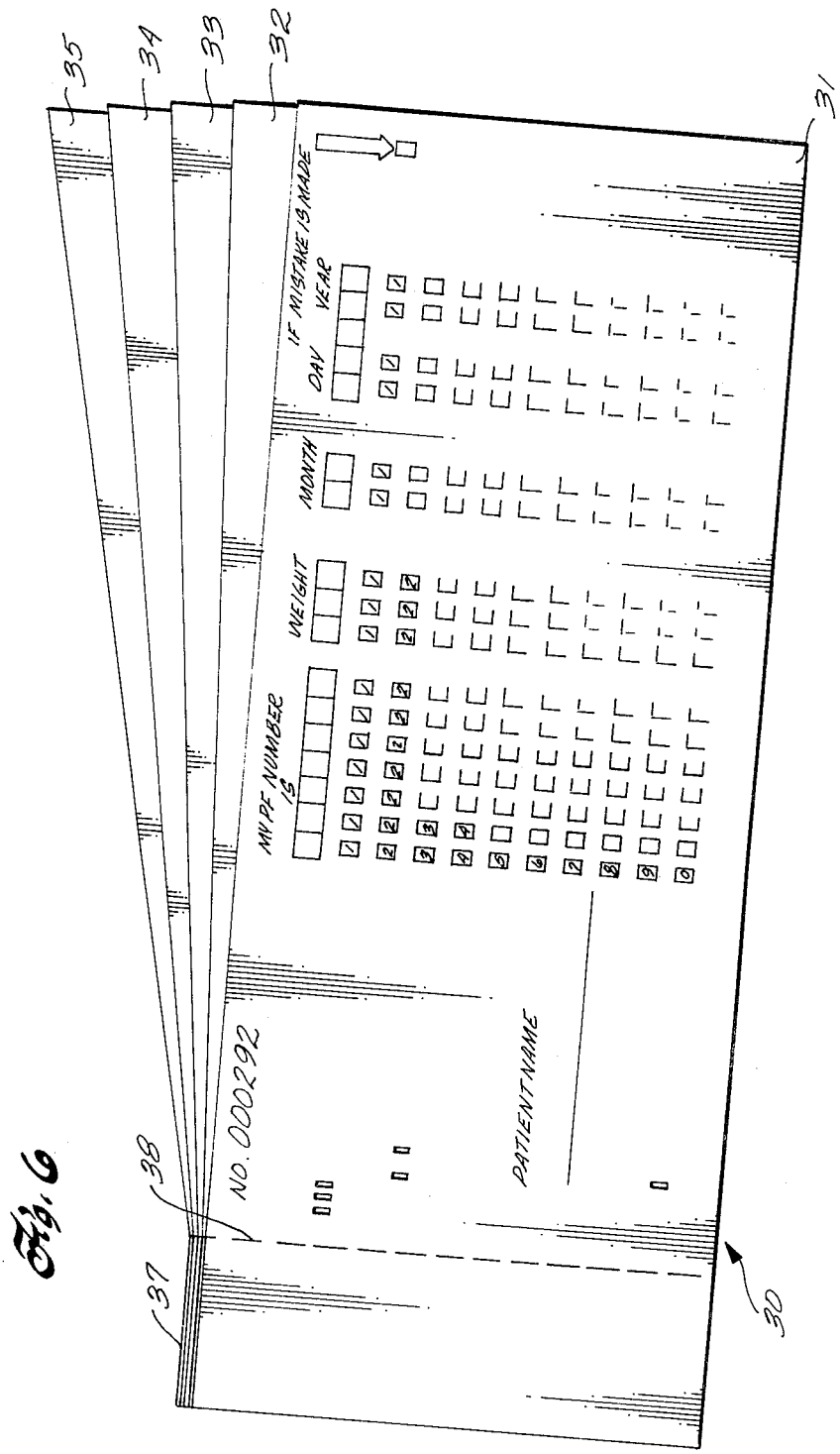
FIG. 6 is a perspective view of a book according to a second, presently preferred embodiment of the invention.

Consider now the second, presently preferred embodiment of the invention. In its second embodiment, the invention provides a book 30 shown in perspective in FIG. 6. A cover record member 31 has an obverse side best seen in FIG. 6 and a reverse side best seen in FIG. 7. A plurality of record members 32 through 35, portions of which can be seen in FIG. 6 are generally the same in nature and function and therefore only one of them, namely record member 32, is shown in detail (FIG. 7).

The book includes binding means 37 for securing the record members together as leaves of a book, and further includes detaching means 38 to enable manual removal of the record members from the book whereupon they can be processed by data processing peripheral equipment. Preferably, the detaching means comprises perforations defining a line separating the record members from pasted together tabs which form the binding means.

Each of the record members 31 through 35 has the overall configuration of a standard 80-column punch card; that is, a rectangular card approximately $7\frac{3}{8}''\times 3\frac{1}{4}''$. The tab portions are preferably approximately 1" wide so that the book is approximately $8\frac{3}{8}''$ wide.

FIG. 7 is directed to showing what is seen when the book is opened to the first page. When so opened, the reverse side of cover record member 31 is on the left and the obverse side of record member 32 is on the right. For convenience of illustration, in FIG. 7, record member 31 is shown rotated by 90 degrees so that written material thereon can be read more conveniently. This written material on the reverse side of a record member gives instructions relating to the obverse side of the next succeeding record member.

The obverse side of record member 32 defines an item display area 32-1 which is shown in detail. It also includes a plurality of other item display areas 32-2 through 32-32 which are not all shown in the same level of detail. A grid comprising horizontal lines 40 and vertical lines 41 defines the boundaries of the item display areas. Each item display area includes an item representation of an item for oral consumption. In item display area 32-1, the item represented is an 8 oz. glass of low fat milk. In item display area 32-3, the item represented is a teaspoon of sugar. Just as in the first embodiment, there is provided a written description of the represented item and a picture illustrating the nature of the represented item and a unit quantity thereof. The small letter "t" adjacent to the teaspoon is explained by the legend on the reverse side of cover record member 31.

Above the picture of the teaspoon there are four spaced-apart bit-entry spaces that together form an entry location for item display area 32-3. Each of these bit-entry spaces are suitably pre-weakened to facilitate a hole punching operation when it is contemplated that the record member is to be processed by a conventional card reader. It bears emphasis that this feature is not critical. In particular, some card readers are adapted to respond to ordinary pencil markings so long as the pencil markings are appropriately positioned in accordance with the conventional coordinate matrix described above in connection with a standard 80-column punch card.

In each of the bit-entry spaces there appears a quantity indicator. In item display area 32-3, the quantity indicators are $\frac{1}{2}$ unit, 1 unit, 2 units, and 4 units which together form indicia describing discrete selectable quantities of the represented item (sugar). If the patient has consumed two teaspoons of sugar during breakfast, for example, in a cup of coffee or tea, then the patient so records that fact by either punching a hole in the 2-unit quantity indicator or by marking it with a pencil.

In item display area 32-27, the represented item is a prescribed medication rather than a food item. It will be appreciated from this that the patient is given a reminder to take a prescribed dosage of medication at an appropriate time. In this connection, it is advantageous to organize the book on a meal-by-meal basis. That is, the items represented on a first page of the book (record member 32) are prescribed for consumption at breakfast. The items represented on the second page (record member 33) are prescribed for consumption at lunch. Usually, a patient's prescribed diet provides a wider range of choices for dinner than for the earlier meals. Accordingly, two record members 34 and 35 are used in book 30 for the dinner meal.

A border area 45 outside of the grid provides space where machine-readable identification information is prerecorded. Preferably, this identification information is entered by a gang-punching operation before the record members are bound.

It will be appreciated that the above-described book and record members thereof provide an advantageous data collecting tool for a dietary clinic. Preferably, for each of the various different categories of diets that are typically prescribed for patients, the dietary clinic will distribute a corresponding book. Thus, the items represented in a book employed for a low-cholesterol diet differ in large measure from the items represented in a book employed for another category of prescribed diet having a different objective. The pre-punched identification information serves to correlate the record member with the particular prescribed diet to which it relates. This of course facilitates processing of the recorded information after the record members are detached from the book and inputted into peripheral equipment.

What is claimed is:

1. Apparatus adapted to cooperate with a machine readable record member for accumulating a dietary journal, the record member having a plurality of spaced-apart entry locations at each of which digitally encoded oral consumption data can be entered, the apparatus comprising means releasably holding the record member;

a plurality of displays, each display including at least one item representation of an item for oral consumption and, in association with each item representation, indicia describing discrete selectable quantities of the represented item, each item representation corresponding to a different one of the entry locations and comprising a written description of the represented item and a picture illustrating both the nature of the represented item and a unit quantity thereof; and means arranging the displays for one-by-one exhibition and operative to expose in registration with each exhibited display each of the entry locations corresponding to the item representations so as to facilitate the entry of digitally encoded food consumption data at the exposed entry locations.

2. Apparatus according to claim 1 wherein the means for holding the record member comprises a frame having a window, the record member being slidable into and out of the frame.

3. Apparatus according to claim 2 wherein the frame is adapted to hold an 80 column punch card which serves as the record member, and wherein the apparatus further comprises a stylus for punching the card to enter the data.

4. Apparatus according to claim 1 wherein the displays are hinged to the holding means so as to be pivotally movable in the manner of leaves of a book.

5. Apparatus according to claim 4 further comprising a top cover hinged to the holding means, the top cover having indicia thereon including a directory of the item representations.

6. Apparatus according to claim 5 wherein each display has a tab.

7. Apparatus according to claim 1 wherein at least one item representation includes a picture illustrating and a written description of a unit quantity of a prescribed medication.

8. Apparatus according to claim 1 wherein at least one item representation includes a picture illustrating and a written description of a unit quantity of a prescribed food.

9. Apparatus according to claim 1 wherein at least one of the displays further includes a picture illustrative of the instructions for recording the results of a test having quantized results.

* * * * *